H. F. CRANDALL AND N. R. KRAUSE.
SELF FEEDER FOR THRESHING MACHINES.
APPLICATION FILED APR. 8, 1918.
1,325,691.
Patented Dec. 23, 1919.
8 SHEETS—SHEET 1.
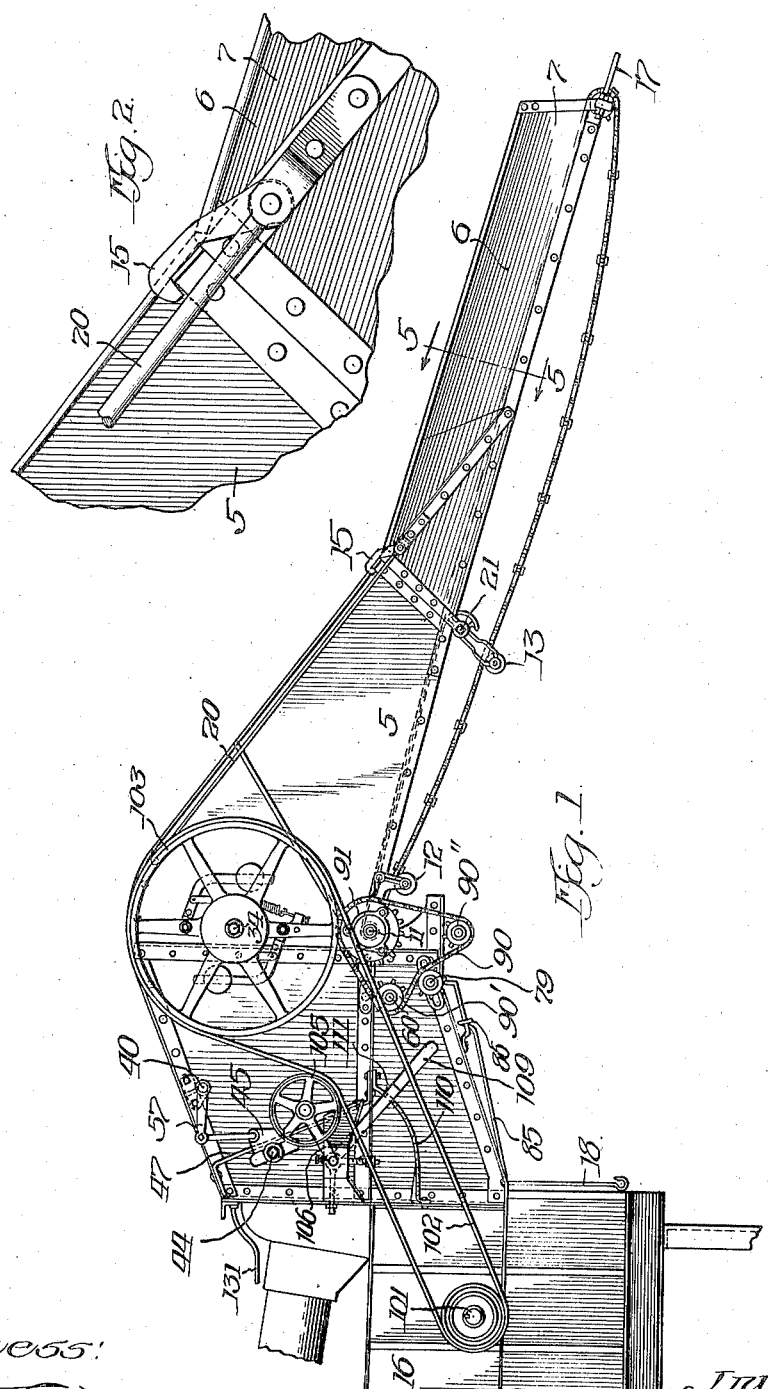

H. F. CRANDALL AND N. R. KRAUSE.
SELF FEEDER FOR THRESHING MACHINES.
APPLICATION FILED APR. 8, 1918.
1,325,691.
Patented Dec. 23, 1919.
8 SHEETS—SHEET 2.
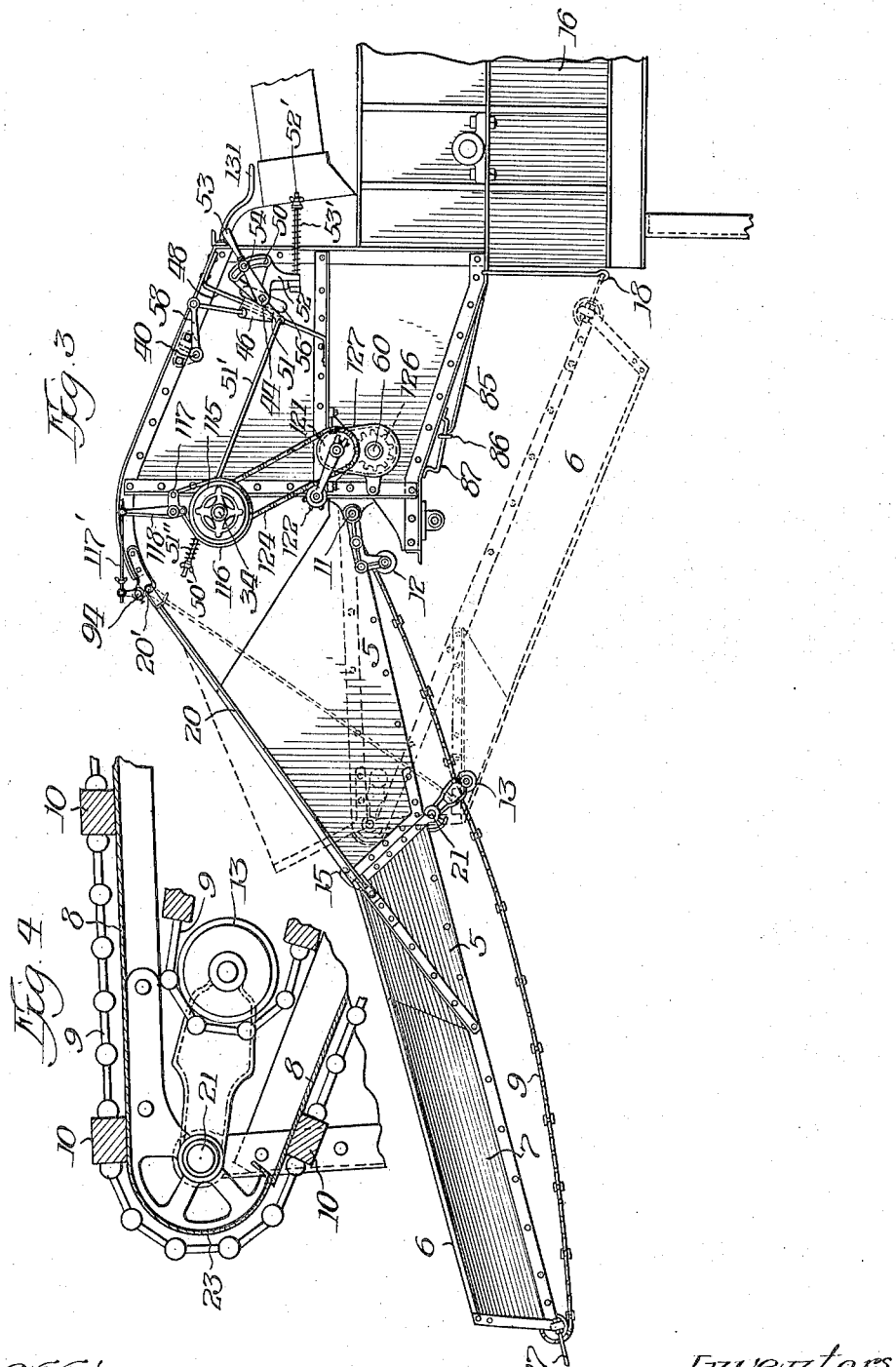

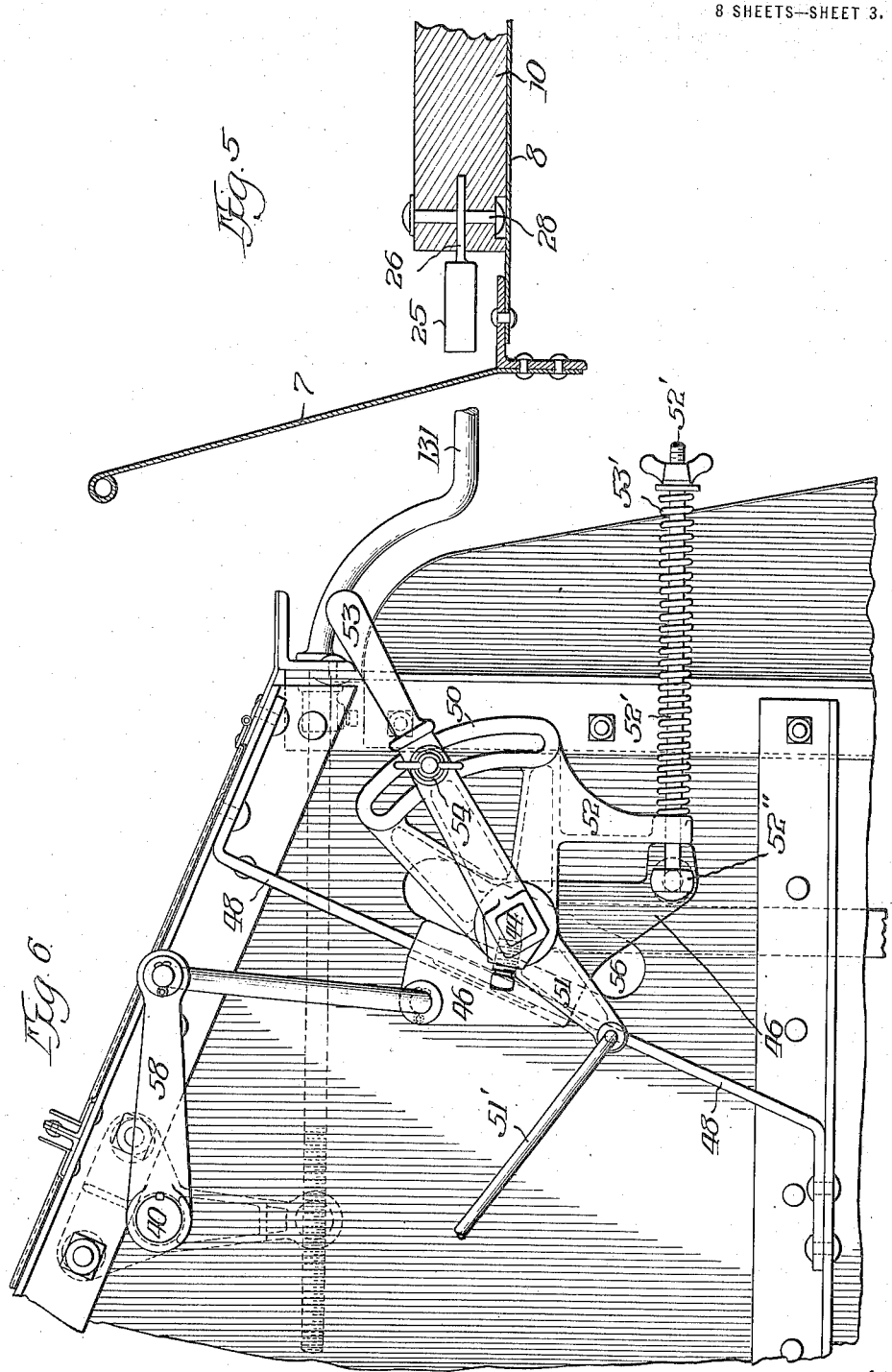

H. F. CRANDALL AND N. R. KRAUSE.
SELF FEEDER FOR THRESHING MACHINES.
APPLICATION FILED APR. 8, 1918.
1,325,691.
Patented Dec. 23, 1919.
8 SHEETS—SHEET 4.
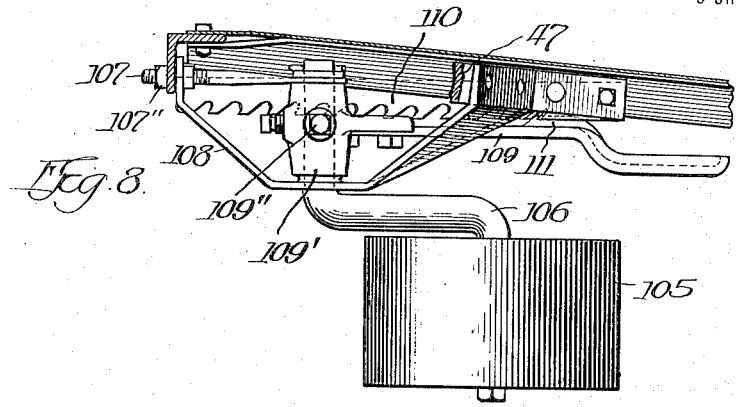
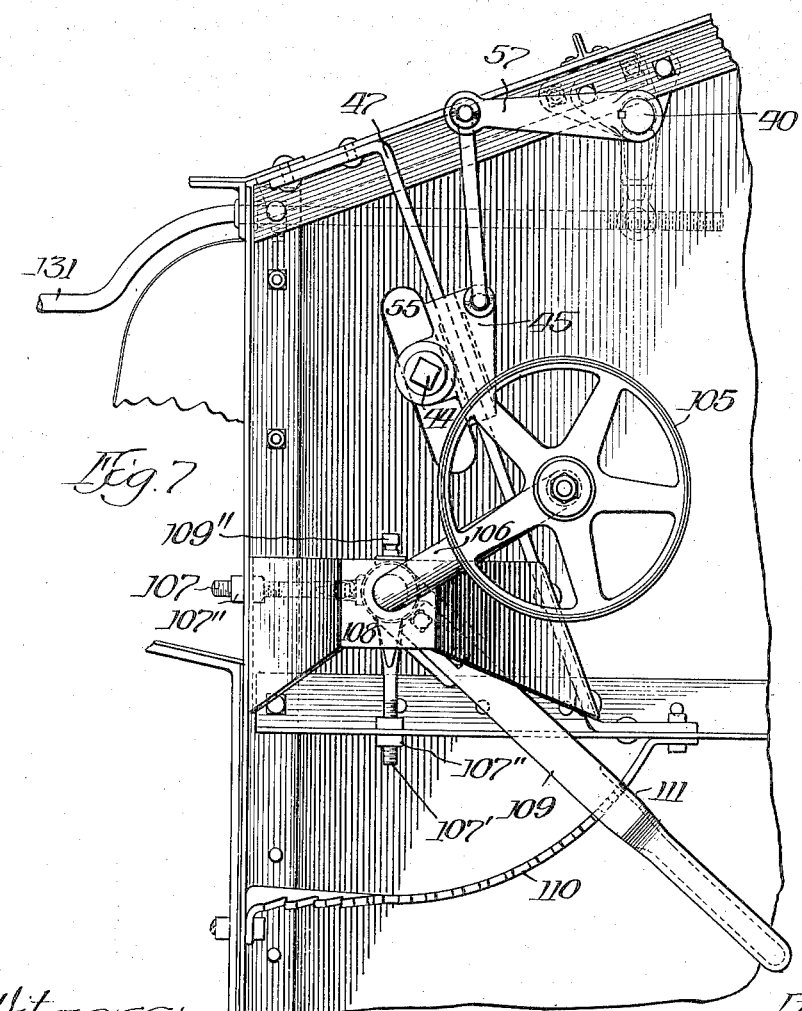

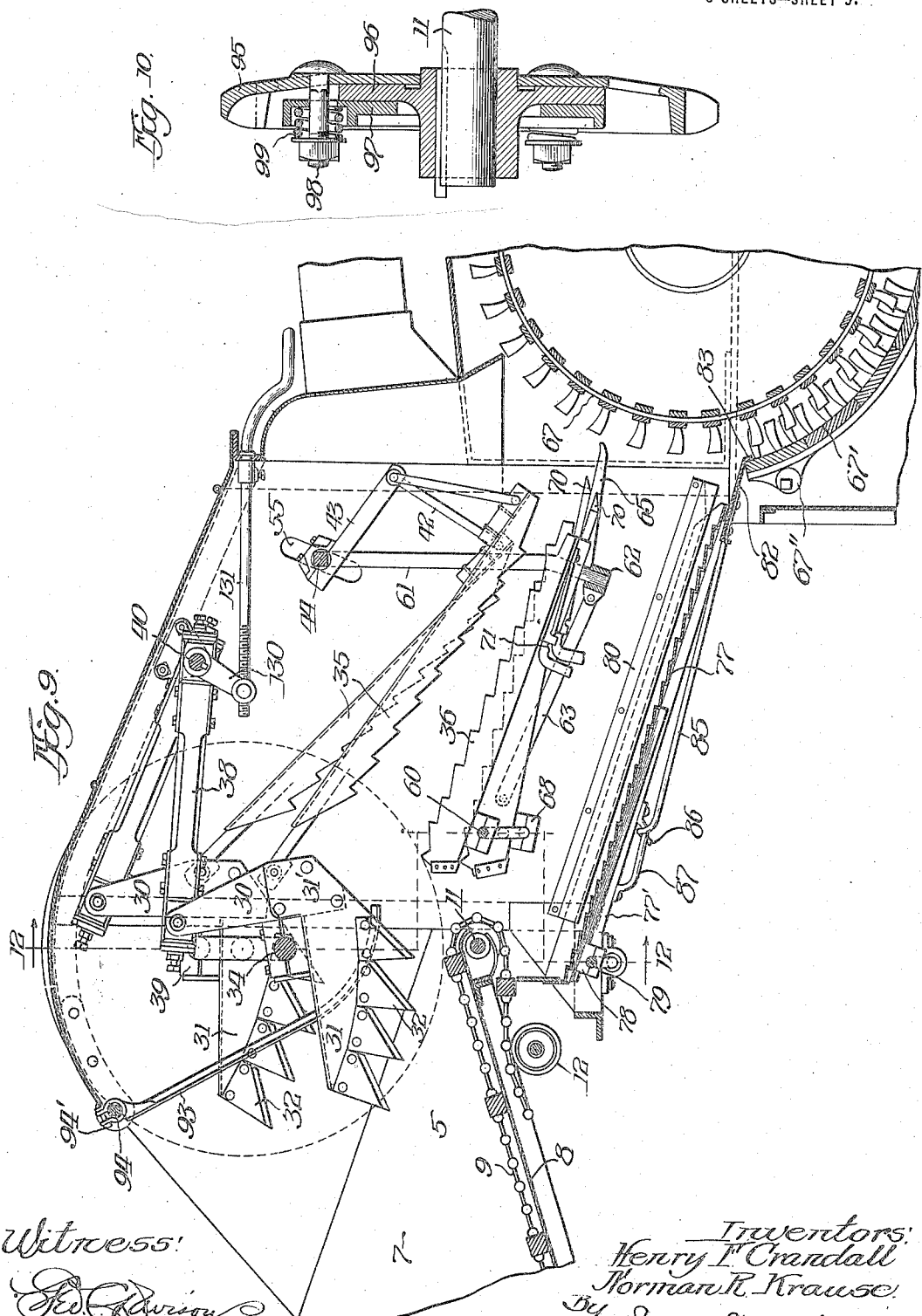

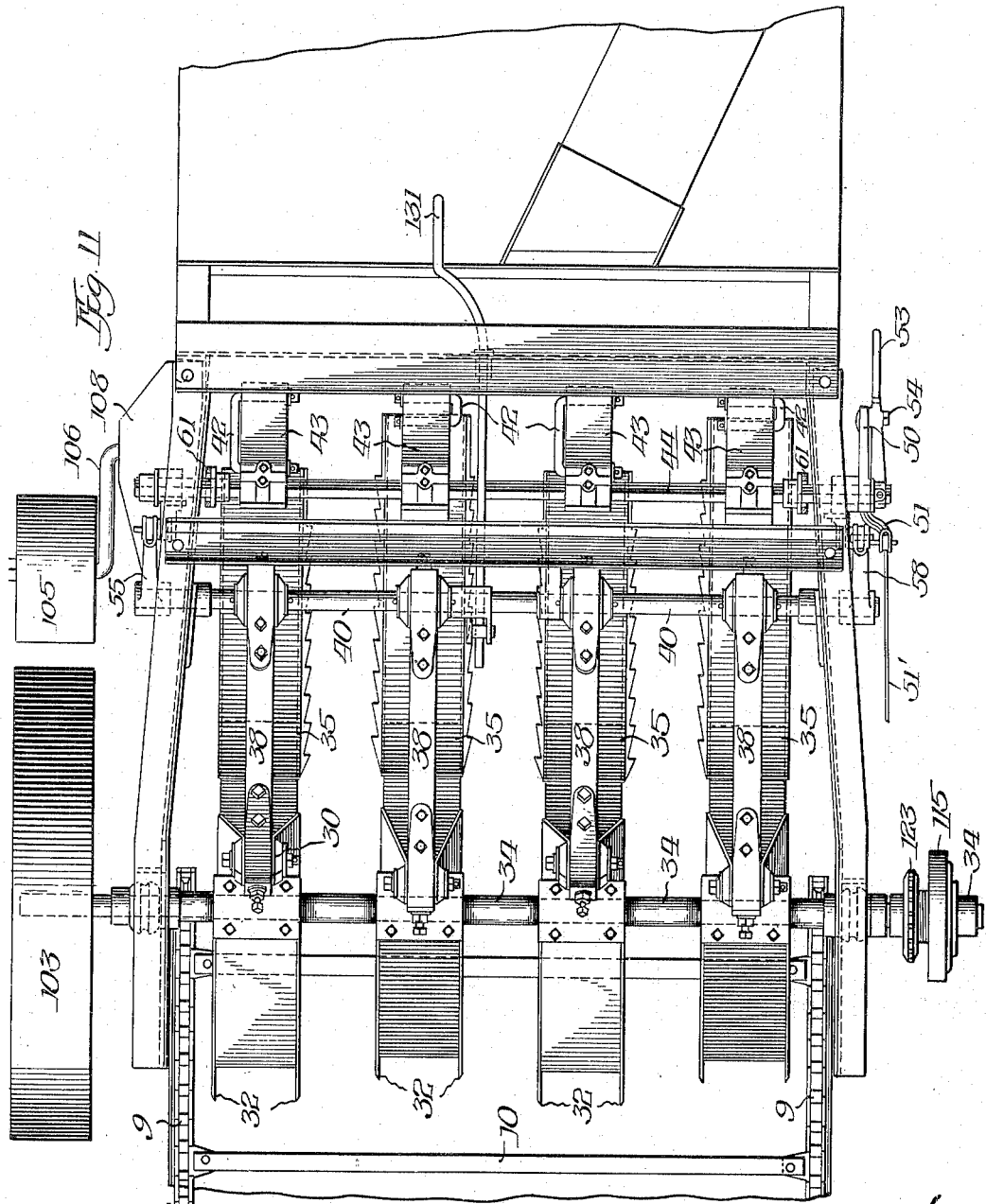

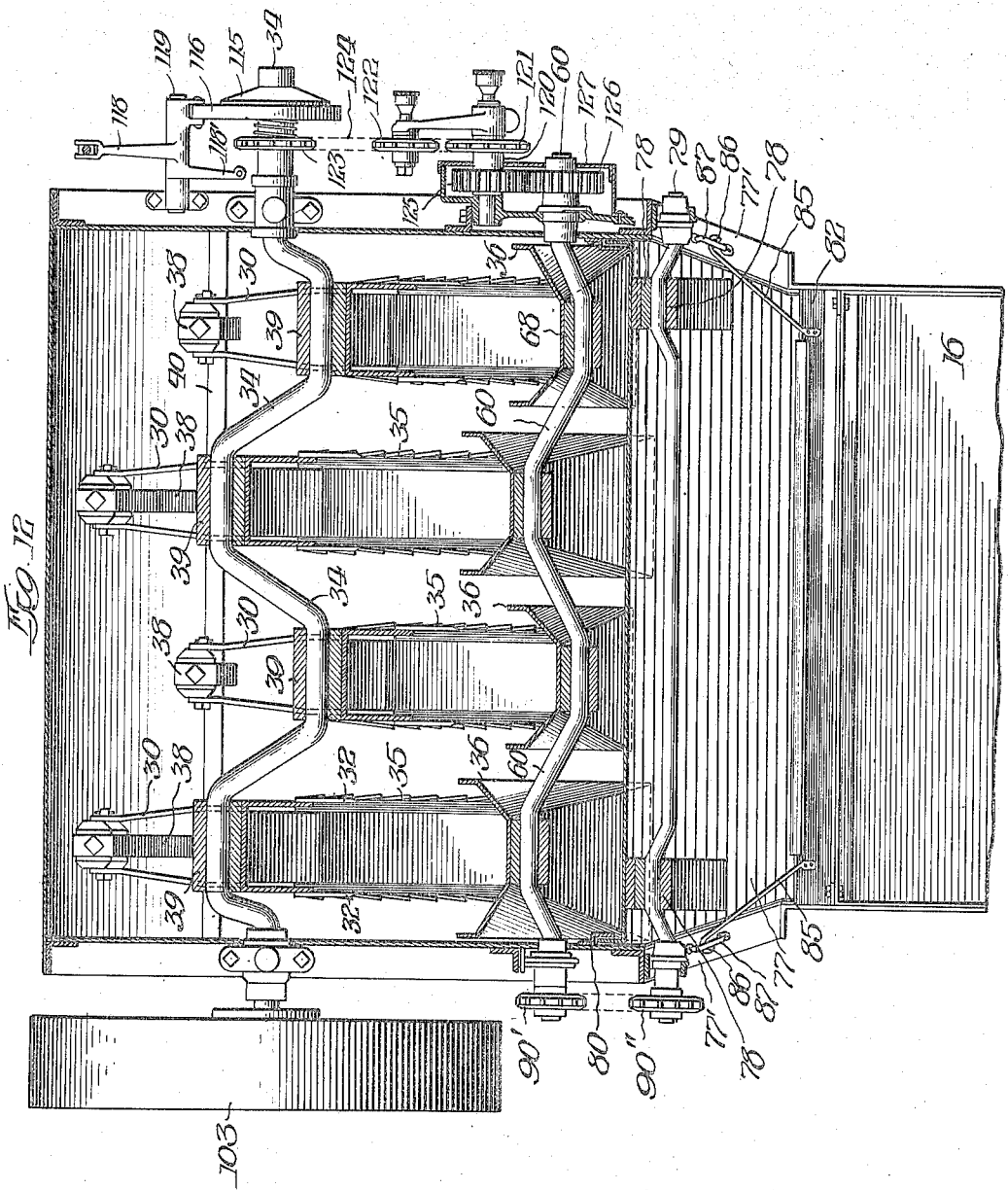

H. F. CRANDALL AND N. R. KRAUSE.
SELF FEEDER FOR THRESHING MACHINES.
APPLICATION FILED APR. 8, 1918.
1,325,691.
Patented Dec. 23, 1919.
8 SHEETS—SHEET 8.
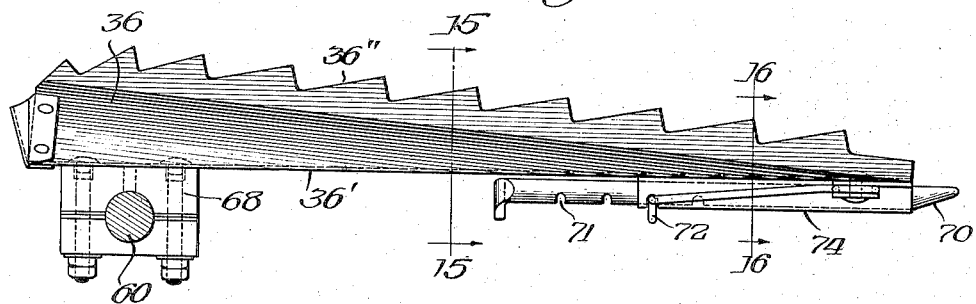
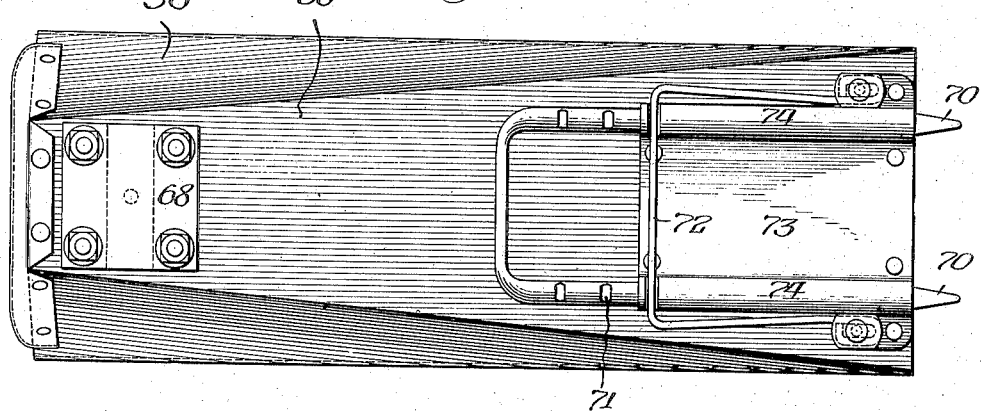
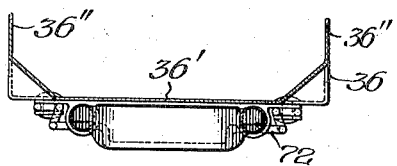
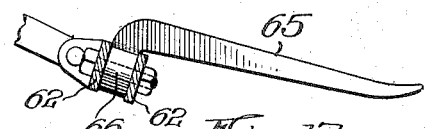
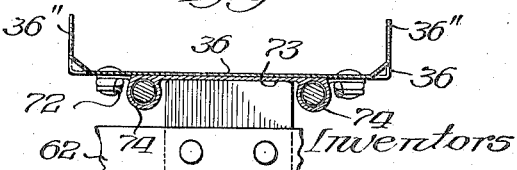

UNITED STATES PATENT OFFICE.

HENRY F. CRANDALL AND NORMAN R. KRAUSE, OF RACINE, WISCONSIN, ASSIGNORS TO J. I. CASE THRESHING MACHINE COMPANY, OF RACINE, WISCONSIN, A CORPORATION OF WISCONSIN.

SELF-FEEDER FOR THRESHING-MACHINES.

1,325,691.   Specification of Letters Patent.   Patented Dec. 23, 1919.

Application filed April 8, 1918.   Serial No. 227,207.

*To all whom it may concern:*

Be it known that we, HENRY F. CRANDALL and NORMAN R. KRAUSE, citizens of the United States, residing at Racine, in the county of Racine and State of Wisconsin, have invented certain new and useful Improvements in Self-Feeders for Threshing-Machines, of which the following is a specification.

Our invention relates to band cutters and feeders, designed for conveying grain bundles to threshing and like machines, cutting the bundles, and feeding them to the threshing cylinder in a uniform manner, and our object is to improve such machinery generally, to render it highly efficient for the purpose, and to insure that it will reliably respond at all times to the varying conditions of the grain which it is necessary to constantly feed to the threshing cylinder in large and substantially uniform quantities, and our improvements consist in certain details of construction and arrangements of parts which we have demonstrated in actual practice accomplish the object stated, all as will be hereinafter more particularly pointed out.

In the accompanying drawings, forming a part hereof, Figure 1 is a side elevation of our improved band cutter and feeder in connection with a portion of a threshing machine; Fig. 2 an enlarged detail of a portion of the conveyer forming a part thereof; Fig. 3 an elevation taken at the opposite side of that shown in Fig. 1 and indicating the position occupied by the conveyer when folded; Fig. 4 an enlarged detail sectional view of the hinged portion of the conveyer; Fig. 5 a transverse sectional view through the conveyer showing in detail the construction of the carrier; Fig. 6 an enlarged side elevation of the feeder showing various controlling mechanisms which we employ; Fig. 7 an enlarged elevation of the opposite side of said feeder; Fig. 8 a plan of the lever and associated parts shown in Fig. 7; Fig. 9 a longitudinal sectional view through the body of the feeder showing the cutting, feeding and spreading mechanisms therein and a portion of the conveyer leading thereto; Fig. 10 a detail sectional view of the conveyer controller; Fig. 11 a plan of the cutting and feeding mechanisms as seen with the top removed from the feeder; Fig. 12 a transverse vertical sectional view taken on the dotted lines 12—12 in Fig. 9; Fig. 13 a side elevation, and Fig. 14 an underside plan of one of the lower feed pans showing retarding fingers associated therewith; Figs. 15 and 16 detail sectional views taken on the dotted lines, 15—15 and 16—16, respectively, in Fig. 13; and Fig. 17 is a side elevation of the stationary retarding finger which we employ.

In said drawings the numeral, 5, indicates the feeding end of the conveyer, and, 6, its receiving end. As is common, the conveyer comprises side walls, 7, and a floor, 8, and positioned at each side of the floor are endless chains, 9, connected by cross members, 10, constituting a movable carrier, which runs about and is actuated by a shaft, 11, at the forward end of the feeder. The lower strands of such chains are guided in their travel and prevented from sagging by means of the idlers, 12, 13, carried by the receiving and delivering sections of the conveyer. When adjusted for operation, the conveyer assumes the position indicated in Fig. 1, the sections being secured at each side by a latch, 15, which insures stability of the structure. When, however, it is desired to move the threshing machine, indicated at 16, the conveyer is shortened by folding to the position indicated by dotted lines in Fig. 3, which is accomplished by disengaging the sections and swinging the receiving end 6 of the conveyer downwardly and inwardly under the feeding section 5, the former carrying a latch, 17, which engages a hook, 18, or otherwise of any suitable arrangement. These sections are connected by rods, 20, one at each side, which is pivotally attached thereto, as at 20, and extends from the feeder body downwardly, and is connected to section 6 approximately at the juncture of the two conveyer sections, and retains them in rigid alinement, so that when section 6 is swung downwardly past its hinge joint, 21, slight pressure must be applied, which causes said rod 20 to follow the movement of section 6, but has such retarding effect thereon as to insure that said section will assume its lowermost position gradually and thus control the swinging movement thereof without permitting it to suddenly fall. During this downward movement, the section 5, being pivoted at 11 to the main frame, is forced upwardly by said rods 20 so that it and section 6 are in the position indicated by the dotted lines in Fig. 3. When the conveyer is to be brought to operative position, as will be understood, it is but necessary to swing section 6 upwardly, when rods 20 reverse their movement and control the assemblage and positioning of the two sections without perceptible shock thereto. By fixedly securing the rods at the points indicated we obtain a substantial balance of the two sections in their opposite movements to each other so that an attendant handling the receiving section may swing the same in either direction without difficulty or strain. In this manner we provide an extremely simple mechanism for quickly and positively adjusting said sections without liability of disalinement, which is a common occurrence through hurry and rough usage of threshing machinery. As the endless chain of such conveyer requires a certain amount of looseness or sagging to permit the ready folding of the sections, considerable difficulty has been experienced by reason of a portion of the links tumbling into openings between the joints of said sections during folding and unfolding operations, causing time and labor to rectify, and to obviate this difficulty we arrange the floor 8 of section 5 to terminate in curved or scroll formation between the section joints, as indicated at 23, Fig. 4, so that when section 6 is swung in either direction this scroll 23 acts as a guard over which the chains and cross members freely ride back and forth, and thus, during all movements of the sections assume the proper relation thereto, which prevents binding between the joints. The endless carrier comprising chains 9 and cross members 10, is arranged so that there will be no binding of the chains in traveling about the conveyer floor, and this we accomplish by providing arms, 25, (Fig. 5) in the ends of said cross members which are preferably composed of metal and provided with shanks, 26, extending into said cross members and secured thereto by bolts or rivets, 28, passing through such cross members and shanks. The chains 9 are secured to said arms 25 and are held above floor 8 as indicated in Fig. 4, so that the only contact with said floor is by the cross members, which insures a steady and uniform movement of said members while traversing the floor without liability of the chains unduly flexing or sagging to disturb the efficient operation of members 10, which is an objection common to conveyers of this character. This arrangement insures that the cross slats are in contact at all times with the floor so that all loose or shelled grain will be carried into the feeder without wastage. As such conveyers are in inclined position, the tendency of shelled grain is to run down and off the conveyer, causing more or less wastage, but by arranging and controlling the cross slats 10 to move along the floor in the manner indicated such grain is prevented from running off the conveyer and is carried to the feeder with the other material; and by supporting the chains above the floor (Fig. 4) they are kept from contact therewith and thus not subject to the wear which would otherwise occur by frictional contact with the floor. By pivotally arranging idler 13 on shaft 21, as indicated in Fig. 4, we insure that the strands of carrier chain 9, when section 6 is folded, will automatically become positioned between the floors of each section, and the chains thus sustained out of contact with other parts of the structure.

During the operation of threshing, as is well understood, the grain bundles in large numbers are constantly deposited onto a conveyer such as described, and are carried to the band cutter where they come into contact with a plurality of cutting knives, each comprising arms, 30, to which are secured cutters, 31, the ends 32 of these cutters being so arranged in relation to each other that the cutting edge of the knife as a whole assumes curved formation, and, as shown in Fig. 9, we provide a number of such knives, which are mounted upon a crank-shaft, 34, so that they will be alternately but constantly actuated to receive the masses of grain bundles delivered from said conveyer, said knives traveling in a curvilinear direction to impart a sweeping effect upon the bundles to cut the bands thereof and to draw the material rearwardly and to within the reach of the upper floating feed rakes, 35, and lower feed pans, 36. These cutters, rakes and feed pans are preferably complementary to each other in number, and we have indicated four as a desirable arrangement. It will be understood, of course, that said cutters have two rows of knives 32 separated from each other, and also that each lower floating pan 36 comprises two serrated walls, in a manner similar to the upper floating pans 35, as indicated in detail in Fig. 12.

Said arms 30 are supported by the crank-shaft 34 and extend to and are connected to pitmen, 38, which govern their movement, the arms 30 being directly connected to said crank-shaft by the bearings, 39, the rear ends of said pitmen 38 being loosely mounted upon shaft, 40. Suspended from the heels 31' of cutter-bars 31 are the upper floating feed-rakes, 35, which are arranged in downwardly inclined position and supported at their lower ends by links, 42, which in turn are suspended from arms, 43, mounted upon a preferably square shaft, 44, which shaft is supported in brackets, 45, 46, (Figs. 6 and 7) positioned at the exterior sides of the feeder and slidably mounted upon rods 47, 48, respectively. On shaft 44 we also mount a slotted quadrant, 50, and form integrally therewith or attach thereto arms, 51, 52, to which tension rods, 51', 52', are movably secured, said rod 52' being anchored at 52'' to bracket 46. On the end of said shaft 44 is a lever, 53, which is shiftably mounted in said quadrant, and secured by a suitable lock, as 54. The walls of the feeder at each side are provided with slots, 55, 56, through which the ends of shaft 44 project to be mounted in the brackets 45, 46, so that said shaft may be shifted as desired by the movement of said brackets, which are caused to be actuated by the motion of the levers, 57, 58, connected thereto and to shaft 40, in a manner to be further described.

The lower feed-pans 36 are mounted upon crank-shaft, 60, their lower ends being supported by a frame comprising the depending members, 61, mounted upon shaft 44; cross-member, 62, secured to their lower ends, and the pivotally mounted arms, 63, secured to the walls of the feeder.

About midway upon said cross-member 62 (Fig. 17) we secure a stationary retarding finger, 65, bolted, as at 66, or otherwise secured thereto, the point of which terminates in close proximity to the cylinder 67 of the threshing machine. Said pans 36, as indicated in Figs. 13 and 14, comprise a suitable bottom, 36', and serrated side walls, 36'', and are preferably provided with bearing blocks, 68, in which crank-shaft 60 is mounted. The under side of pan 36 is provided with one or more adjustable retarding fingers, 70, but in practice we find two for each pan extremely efficient, and, therefore, for simplicity and readiness in adjusting, prefer to arrange the same in staple form (Fig. 14), the members of which are notched, as at 71. When said fingers are projected or withdrawn to the desired position they may be so secured by engaging a spring, as 72, in the notches 71, as clearly indicated in said figure, from which it will be readily understood that by slightly lifting said spring the fingers can be shifted in either direction as desired. To insure the perfect alinement of said fingers we prefer to confine the same within a guard of any suitable character, and as a preferred device for the purpose we illustrate the housing, 73, embodying the channels, 74, for positively retaining said fingers in true position, but we do not desire to limit ourselves to the specific construction and arrangement of fingers and controlling means associated therewith, as other expedient equivalents may be resorted to for accomplishing the same purpose, and, as indicated, we employ one or more fingers adapted to be adjusted to requirements incident to the operation of feeding material. In the construction of pan 36 we find in practice that its efficiency is increased by diverging its side walls 36'' toward its lower end, thus assuring that material delivered thereinto during its reciprocatory action will more readily separate and thus be more thoroughly spread at the point of discharge over the retarding fingers toward the cylinder; and by thus converging said pans at the point of connection with crank-shaft 60 we provide sufficient clearance between such pans for the movement of the cranked portions of said shaft.

Beneath pans 36 we arrange a vibratory shaking pan, 77, having a stepped bottom, as indicated, the upper end of which is mounted by suitable bearings, 78, upon a crank-shaft, 79, said pan being of well known construction and extending across the under side of the feeder as is usual. At either side of said pan 77, projecting from the side walls of the feeder, we place deflectors, 80, for directing falling material onto said pan. In the operation of threshing machines it is frequently necessary to obtain access to the cylinder 67 and concave 67', and, so far as we are aware, this has been difficult and has consumed considerable time, because of the necessity for removing more or less of the feeding mechanisms so that an operator on the ground may adjust or repair the cylinder and concave. In order to simplify this duty we provide a loosely mounted feed-plate, 82, which rests upon said concave or parts associated therewith, and which preferably has a lip, 83, to overlap and engage said parts. The lower end of shaking pan 77 rests upon said feed plate so that it can be reciprocated therealong by the action of crank-shaft 79. Secured to said feed plate 82 at each side thereof is a rod or member, 85, having a hooked end, 86, which slidably engages a loop, 87, secured on the under side of the feeder frame 77'. Said shaking pan 77 being hingedly mounted on shaft 79 may be readily raised and lowered, and when it is desired that an attendant shall have access to the cylinder 67 or concave 67' it is but necessary to raise said pan, during which operation feed-plate 82 may be lifted from its resting place, and, as it is attached to rods 85, the latter can be shifted along loops 87 to a point where feed plate 82 will be cleared from contact with the parts upon which it rests and swung downwardly, and, as said plate has thus been removed, shaking pan 77 can also be lowered out of the way, thereby providing sufficient clearance in a simple and ready manner for entrance to the concave and cylinder; and, as will be readily understood, said swinging parts may as readily be returned and secured in normal position. It is common practice to adjust concave 67' in different positions to suit varying conditions of grain, usually through eccentric 67″. By attaching feed plate 82 to rods 85 in the manner described we provide such plate in adjustable position to follow the adjustment of the concave or associated parts, which adjustment is permitted as desired through sliding rods 85.

As will be observed, in Figs. 1 and 9, the crank-shaft 60 for the floating pans 36, the crank-shaft 79 for the shaking pan 77, and drive shaft 11 for the conveyer, are comparatively closely assembled, and, therefore, rotary motion thereto is readily imparted by a single chain, 90, communicating with sprockets 90′ and 90″ on said crank-shafts, and a release or slip-drive, 91, on conveyer shaft 11. Said slip-drive 91 may be of any appropriate character to control the movement of the carrier, (hereinafter referred to as 9), that is to say: as will be understood, the grain bundles are pitched onto the conveyer rapidly from wagons or otherwise at one or both sides thereof, and are carried to the feeder in irregular arrangement. It frequently occurs through negligence or accident that a bundle will fall from the side of the feeder onto the traveling chain 9 and becomes jammed between it and the underside of the conveyer, which condition, of course, would cause a disruption of the moving mechanism unless guarded against. Likewise a cross slat may become broken or distorted under heavy loading in a manner to obstruct the movement of the carrier, or extraneous articles may be accidentally introduced to cause such disorganization. In such emergencies the strain upon the shaft 11 causes its rotary cessation, and, as the release or slip-drive 91 therefor is arranged in the manner hereinafter explained, its actuating parts become idle simultaneously with said shaft, while its sprocket 95 continues its rotation through the action of chain 90, but instantly upon the adjustment of the carrier said drive resumes its normal function of actuating the shaft 11 and the conveyer chains which communicate therewith. As indicated, any suitable clutch or slip-drive construction for shaft 11 may be employed, our preferred form being that shown in Fig. 10, which comprises a sprocket, 95, mounted adjacent a disk, 96, keyed to shaft 11, said sprocket being connected to a wheel, 97, by bolts, 98, around a portion of which bolts we arrange springs, 99, which normally maintain said sprocket 95 and wheel 97 in frictional engagement with disk 96. It will be understood, therefore, that when any slight clogging of the straw bundles occurs in the conveyer said sprocket 95 will run idly about disk 96, but instantly the obstruction is removed said sprocket will resume sufficient contact with said disk to continue the rotation of shaft 11.

As may also be explained, the primary rotary motion to the feeder mechanisms is imparted by the cylinder shaft, 101, from which a belt, 102, communicates with a speed governor, 103, which drives the crank-shaft 34. As said belt is driven at high speed and has heavy duty to perform, it is essential that its tension be carefully controlled, and for this purpose we provide a finely adjustable belt tightener, 105, (Figs. 7 and 8) in the form of a pulley mounted upon a stud crank-shaft, 106, which shaft is revolubly mounted in bracket, 108, on the side of the feeder body. In order to adjust said tightener to the belt requirements, we secure thereto a lever, 109, by which said shaft 106 may be turned as desired and the pulley thus elevated and lowered, and which shaft may be held in adjusted position by a ratchet-bar, 110, and detent, 111, (indicated in dotted lines, Fig. 7) of any suitable character engaging therewith. We are also enabled to adjust said tightener in different directions independently of the raising and lowering thereof by means of eye-bolts 107, 107′, which are looped about the end of shaft 106. These bolts are provided with nuts 107″ (Fig. 7) which, by means of a suitable implement, may be tightened or loosened on the bolts so that the latter may be moved, thus tilting said shaft to position pulley 105 as desired. Lever 109 (Fig. 8) is mounted in socket 109′ and is adjustable thereon by means of the set screw 109″ to accommodate its position to the angle at which crank arm 106 may be adjusted.

We employ a speed governor as 103, arranged to run at predetermined speed, which is to insure that the feeder mechanism will not be operative until the threshing machine mechanism has obtained practically its normal speed; that is to say, when the motive power for actuating the threshing machinery slows down or for any other reason decreases its power, or should the threshing cylinder become overburdened with material to such extent as to cause its rotation to be appreciably checked, it is necessary to prevent further material from entering the cylinder. When this occurs the speed of the governor also decreases accordingly, causing it to run idly, with the consequent cessation of operation of the feeding mechanisms, but instantly the motive power or cylinder regain their normal speed the governor simultaneously increases in speed, and, therefore, the mechanisms controlled thereby become actuated. As this is a well known provision in the construction and operation of band cutters and feeders said governor will not be more specifically described herein.

As a further means for compensating for the irregularities and control of movement of the straw toward the cylinder, we employ a straw governor, 115, (Fig. 12) which is mounted upon the end of crank-shaft 34 (which comprises clutch mechanisms not necessary here to describe) and with which communicates a brake-strap, 116, anchored at 117 to a crank-lever, 118, which in turn is connected to rock-shaft 94 (Fig. 9) supporting the straw governing fingers 93. Said lever 118 is mounted upon a stud shaft 119 and is provided with a depending arm 118' through which rod 51' projects and is maintained in tension by spring 51" which is held between the end of said rod and said arm 118", the tension power of said rod being regulated by means of the adjusting wing nut 50'. Beneath said straw governor upon a stud-shaft, 120, we mount a sprocket, 121, and preferably associate therewith a chain tightener, 122, about which and sprocket, 123, a chain, 124, travels and imparts rotary motion to gear, 125, on shaft 120, which gear meshes with gear, 126, on crank-shaft 60, said gears being incased in a shield, 127. When governor fingers 93 are actuated through any excess material, this movement is transmitted to the lever 118 and rod 117', causing a clamping or braking action of band 116 upon straw governor 115, which disengages clutch sprocket 123 from shaft 34, thus rendering said clutch as a whole inactive, which cessation in turn stops the movement of conveyer 9, feed pan 36, and also shaking pan 77, which parts so remain until such time as the cutters have propellel enough material rearwardly to allow the governor fingers 93 to return to normal position by gravity, at which instant clutch brake or strap 116 is released, when the straw governor 115 becomes automatically transformed into a rotary driving element and actuates shafts 60, 79 and 11 to operate the mechanisms communicating therewith. When the material becomes bunched under straw governors 93 or the floating rakes 35, the forward cutters and said rakes continue in operation, thus combing and clearing the excess material from pans 36, said pans and the shaking pan 77 beneath and conveyer 9 being in inactive condition, and upon the removal of such excess said inactive parts again resume operation; and it will be also understood that when an excess amount of material is propelled between pans 36 and rakes 35 sufficiently to cause the latter to raise such movement will in turn rock shaft 44, thus moving bracket 50, 51, 52, causing tension rod 51' through arm 118' to pull against lever 118, thereby tightening clutch-band 116, to cause cessation of the elements controlled by clutch 115 until such excess material has been disposed of.

The action of crank-shaft 34 has a reciprocating effect upon upper floating rakes 35, which coöperate with reciprocating pans 36 to engage and propel the straw masses toward cylinder 67, in an efficient manner. It is essential that all the material shall enter the cylinder vertically, that is, either the butt or top ends first, so that it will be in circumferential relationship thereto longitudinally. However, under some conditions it occurs that an uncut bundle or mass will be advanced along the pans 36 and onto finger 65 in substantially crosswise position, at which point, through the suction of the cylinder and the support of said finger, the material is caused to be tipped and drawn into the cylinder endwise, during which action the reciprocating pans 36 and adjustable retarding fingers 70 coöperate to properly advance and straighten the material, and because of their peculiar alternating action prevent an excess amount from entering at one time. In this manner the material is effectively delivered to the cylinder, and, therefore, in the most favorable arrangement to be acted upon by the cylinder teeth. As indicated, said retarding fingers are preferably arranged in pairs at the end of each pan, and are instantly adjustable toward and away from the cylinder, and in this way we provide an adjustable throat between the said pans and cylinder to accommodate varied grain conditions, as, for instance, when threshing tough grain, the best results are obtained at the entrance to the cylinder by adjusting the retarding fingers close thereto, while under more favorable conditions they may be withdrawn therefrom as desired. The shaking pan 77, of course, lying beneath the pans 36, receives loose grain conveyed by the carrier 9 and also that falling from the pans, and because of its vibratory action propels the same over feed-plate 82 into concave 67'.

Under some conditions of grain greater efficiency in handling the straw through the floating rakes is attained by providing more or less space between the lower ends thereof and pans, 36, and this we readily accomplish (Figs. 6 and 9) by the lever 53 attached to shaft 44, the shifting of which lever rocks said shaft and raises or lowers arms 43, as the case may be, thus in turn elevating or lowering the rakes 35, whereby we are enabled to provide a readily adjustable throat of varied dimensions.

During the feeding operation it also becomes desirable under certain conditions to raise both the upper rakes 35 and the feed pans 36, and this we accomplish in a simple and expeditious manner by fixedly securing to shaft 40 an arm, 130, trunnioned at its lower end, in which is inserted a screw-threaded adjusting rod, 131, which extends outside the feeder within convenient grasp of an attendant, who by rotating the rod in the desired direction turns shaft 40 in opposite direction, which, through the levers 57, 58, (Figs. 6 and 7) actuate brackets 45, 46, to slide up and down on rods 47, 48, and as said brackets support said shaft 44, which in turn supports the rakes by the links 42 and arms 43, and also supports the feed pans by the frame members 61, 62, 63, said pans are raised or lowered as desired in the simple and positive manner described. By this simple arrangement the feeder mechanisms can be adjusted while in operation to feed high or low onto the cylinder to suit grain conditions, and, as will be understood, the cylinder has great suction effect upon the material when fed low, but in being enabled to feed high when conditions require we obtain a more thorough combing effect upon the material. As heretofore explained, the upper floating rakes are adjustable up and down through the rocking of shaft 44 by the lever 53. In threshing tough grain it is advisable to set said rakes comparatively close to the feed pans, and in that or any other position to apply yielding pressure thereto for producing a forcing effect upon the grain, and in thus maintaining said rakes yieldingly in predetermined position we guard against breakage of the feeding structures when large wads of material pass under the rakes. This situation we control by means of the adjustable tension-rod 52' (Fig. 6), which is pivotally anchored to bracket 46, the spring 53' of which has a yielding effect upon arm 52 and through it the shaft 44 and mechanisms associated therewith, so that when said floating rakes are raised by irregularities in the masses of material said tension-rod will automatically return the same to normal position.

We claim as our invention:

1. In a self-feeder, a crank shaft, band cutting means connected therewith, pitmen connecting with said cutters, a shaft for supporting the opposite ends of said pitmen, rakes connecting with said cutters, means for supporting the opposite ends of said rakes, a shaft for supporting said rake supporting means, feed pans beneath said rakes, means for supporting said feeding pans and connecting with said rake supporting shaft, means connecting with said pitman shaft and said rake supporting shaft for adjusting the latter and said rakes and pans, and means connecting with said pitman shaft whereby the same may be turned to adjust said rake supporting shaft and mechanisms connecting therewith.

2. In a self-feeder, a crank shaft, band cutting means connected therewith, pitmen connecting with said cutters, a shaft for supporting the opposite ends of said pitmen, rakes connecting with said cutters, means for supporting the opposite ends of said rakes, a shaft for supporting said rake supporting means, feed pans beneath said rakes, means for supporting said feeding pans and connecting with said rake supporting shaft, means connecting with said pitman shaft and said rake supporting shaft for adjusting the latter and said rakes and pans, and an adjusting rod flexibly connected to said pitman shaft for turning the same to adjust said rake-supporting shaft and the mechanisms connecting therewith.

3. In a self-feeder, a crank-shaft, band cutting means mounted thereon and extending rearwardly therefrom, pitmen connecting with said band cutting means, a shaft upon which said pitmen are mounted, and means for turning said shaft independently of the movement of said pitmen.

4. In a self-feeder, a crank-shaft, band cutters supported on said shaft and having arms extending therefrom, pitmen connected to said arms and extending rearwardly therefrom, and adjustable means for pivotally supporting the opposite ends of said pitmen whereby said band-cutters and pitmen are simultaneously actuated by said crank shaft.

5. In a self-feeder, band-cutting means, means for actuating the same, straw rakes connected therewith, feed-pans beneath said rakes, a frame for supporting the said rakes and pans, and levers for vertically adjusting said frame for simultaneously raising and lowering said rakes and pans.

6. In a self-feeder, band-cutting means, means for actuating the same, straw rakes connected therewith, feed-pans beneath said rakes, a frame for supporting said rakes and pans, means for adjusting said frame to vertically move said rakes independently of said pans, and means for adjusting said frame to simultaneously adjust said rakes and pans.

7. In a self-feeder, reciprocatory straw rakes, means for flexibly supporting the same, feed-pans beneath said rakes, means associated with said flexible supporting means for positioning said rakes in predetermined relation to said pans, and means for yieldingly controlling said rakes whereby when raised by straw masses said rakes will be automatically returned to normal position.

8. In a self-feeder, a crank-shaft, feed-pans mounted thereon, a flexible frame for supporting and vertically adjusting the lower ends of said pans, a stationary retarding finger mounted on said frame, retarding fingers mounted on said pans, and means for adjusting said retarding fingers to project at varying lengths therefrom.

9. In a self-feeder, band cutters, straw rakes connected therewith, feed pans beneath said rakes and co-acting therewith to propel material to a threshing cylinder, a flexible frame having means associated therewith for supporting and vertically adjusting the lower ends of said rakes and pans, a stationary retarding finger mounted upon said frame, and adjustable fingers mounted upon said pans for coöperating with said stationary finger for rectifying the position of said straw bundles entering said cylinder.

10. In a self-feeder, a frame comprising depending members and a cross-piece, feed pans supported upon said cross-piece, a shaft for supporting said depending members, arms mounted upon said shaft, straw rakes above said feed pans, flexible means connecting said arms and rakes, and means for actuating said shaft whereby said frame may be adjusted to move said rakes and pans.

11. In a self-feeder, a shaft, a frame having thereon straw cutting and propelling mechanisms, means connected with said shaft for vertically adjusting the same and said frame, a pitman shaft, a crank-lever connected to said pitman shaft and said vertically adjusting means, and means for actuating said pitman-shaft for operating said crank-lever to raise and lower said bracket and the mechanisms connected thereto.

12. In a self-feeder, an adjustable frame having thereon straw cutting and propelling mechanisms, means connecting therewith for manually adjusting said frame, and means connecting with said frame for adjusting the same independently of said manual means.

13. In a self-feeder, a frame for supporting straw propelling mechanisms, means connected therewith for manually adjusting said frame, means for adjusting said frame independently of said manual means, and yielding means associated with said manual adjusting means for returning to normal position mechanisms supported by said frame.

14. In a self-feeder, a frame for supporting straw propelling mechanisms, a bracket connected with each side of said frame, means connected with said bracket for raising and lowering the same, means for guiding said brackets in their movement, means for adjusting said frame independently of said brackets, and means associated with said independently adjusting means for imparting yielding action to mechanisms supported by said frame.

15. In a self-feeder, a series of straw rakes, a series of feed-pans positioned therebeneath, a frame for supporting said rakes and pans, a shaft to which said frame is connected, said shaft projecting through the sides of said feeder body, sliding tracks on said feeder, brackets supporting said shaft and mounted on said tracks, and means for actuating said brackets to raise and lower said shaft and the mechanisms connected therewith.

16. In a self-feeder having a slotted body, a series of straw rakes, a series of feed-pans positioned therebeneath, a frame for supporting said rakes and pans, a shaft on which said frame is mounted, said shaft projecting through said slotted body, and means engaging said shaft for rocking the same to adjust said frame and the mechanisms carried thereby.

17. In a self-feeder, a series of pitmen, a shaft for supporting the same, a straw rake frame, means communicating with said shaft and said frame for adjusting the same, an arm secured to said shaft, and a rod adjustably secured in said arm whereby when said rod is rotated said shaft is actuated to adjust said frame.

18. In a self-feeder, a series of band cutters, a series of straw rakes communicating therewith, a series of feeding pans underneath said rakes, means for actuating said cutters, rakes and pans simultaneously, means independent of said actuating means for preventing the movement of said pans, means for adjusting said rakes independently of said pans, and means for simultaneously adjusting said rakes and pans.

In testimony whereof we affix our signatures in the presence of two witnesses.

HENRY F. CRANDALL.
NORMAN R. KRAUSE.

Witnesses:
E. M. JOHNSON,
J. A. WALSH.